United States Patent [19]
Jeuffray et al.

[11] Patent Number: 5,340,007
[45] Date of Patent: Aug. 23, 1994

[54] MOTOR VEHICLE ROOF-RACK

[75] Inventors: Jean-Marie Jeuffray, Bressuire; Michel Memeteau, St-Varent, both of France

[73] Assignee: Farnier & Penin, Bressuire, France

[21] Appl. No.: 56,901

[22] Filed: May 5, 1993

[30] Foreign Application Priority Data

May 6, 1992 [FR] France .................... 92 05580

[51] Int. Cl.5 ............................................ B60R 9/04
[52] U.S. Cl. ........................... 224/321; 224/315; 224/317; 224/320; 224/325; 224/42.01
[58] Field of Search ........ 224/309, 315, 317, 320–321, 224/322, 325, 41.02, 329

[56] References Cited

U.S. PATENT DOCUMENTS

| | | | |
|---|---|---|---|
| 3,385,488 | 5/1968 | Bronson | 224/320 X |
| 4,449,656 | 5/1984 | Wouden | 224/320 |
| 4,627,559 | 12/1986 | Andersson | 224/329 |
| 4,736,878 | 4/1988 | Rasor | 224/321 |
| 5,009,337 | 4/1991 | Bimbi | 224/320 X |
| 5,071,050 | 12/1991 | Pudney et al. | 224/321 |

FOREIGN PATENT DOCUMENTS

| | | | |
|---|---|---|---|
| 3428154 | 2/1986 | Fed. Rep. of Germany | 224/321 |
| 3641745 | 12/1986 | Fed. Rep. of Germany . | |
| 3814799 | 5/1988 | Fed. Rep. of Germany . | |
| 2661378 | 4/1990 | France . | |
| 9108929 | 11/1990 | PCT Int'l Appl. | 224/321 |

Primary Examiner—Ernest G. Cusick
Attorney, Agent, or Firm—Griffin Butler Whisenhunt & Kurtossy

[57] ABSTRACT

The roof-rack device for a motor vehicle roof comprises at least two longitudinal elements coupled to the vehicle roof via respective pairs of end legs, with each longitudinal element being made up of at least three portions, namely: two end portions each extending between a corresponding end leg and an additional leg; and one central portion connected to the end portions by releasable link structure enabling said central portion to be installed either between the two end portions of the same longitudinal element, or else between two end portions of two different longitudinal elements, and situated at the same longitudinal position along the roof of the vehicle.

8 Claims, 3 Drawing Sheets

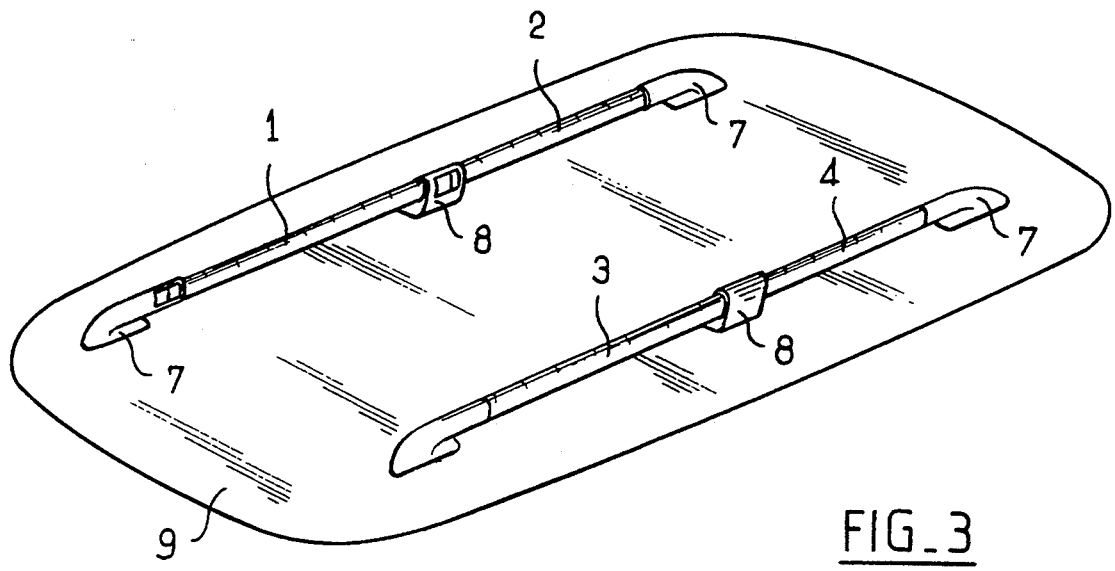
FIG_3
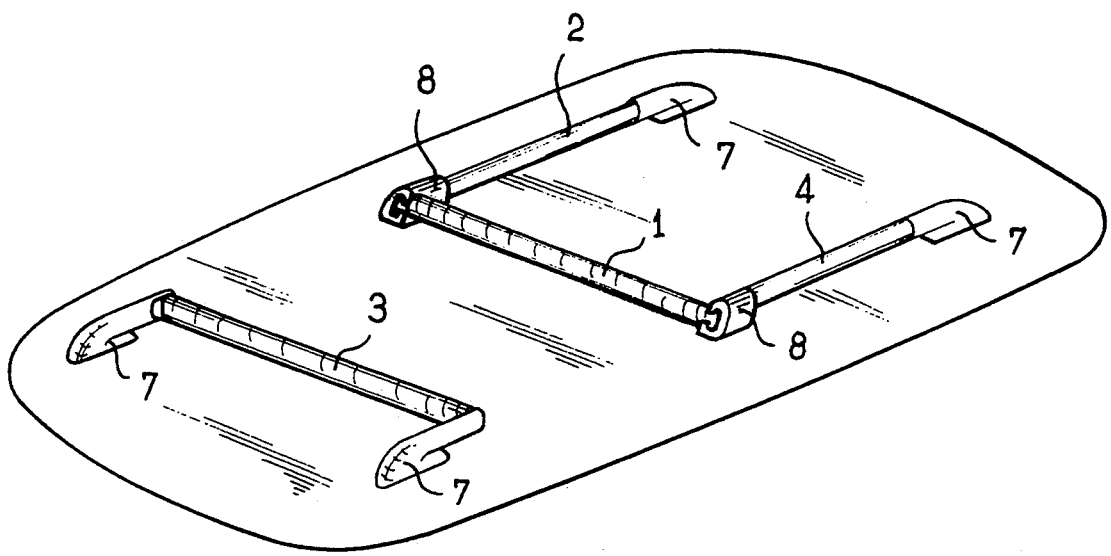
FIG_4

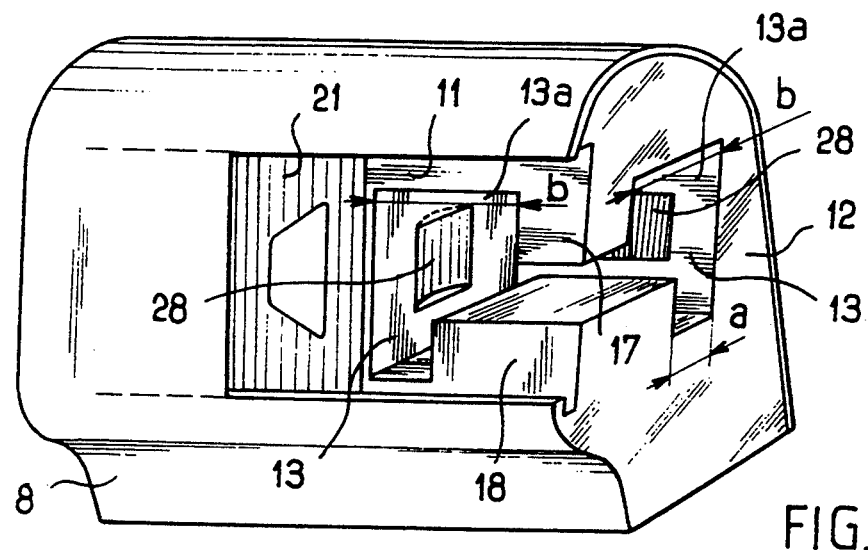
FIG. 5
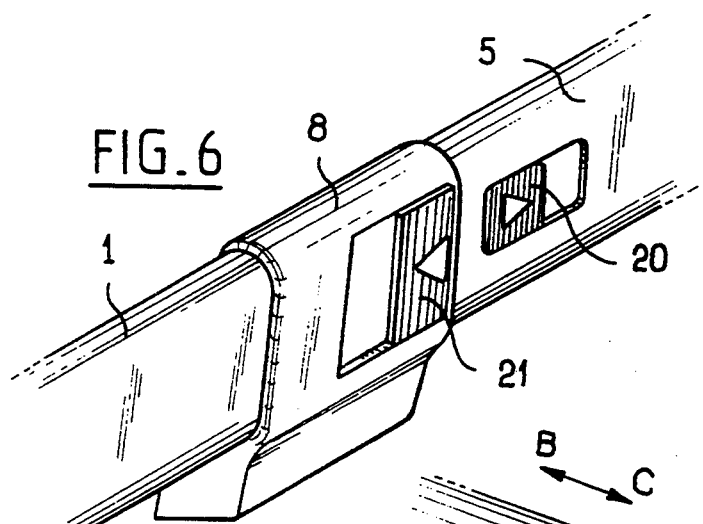
FIG. 6
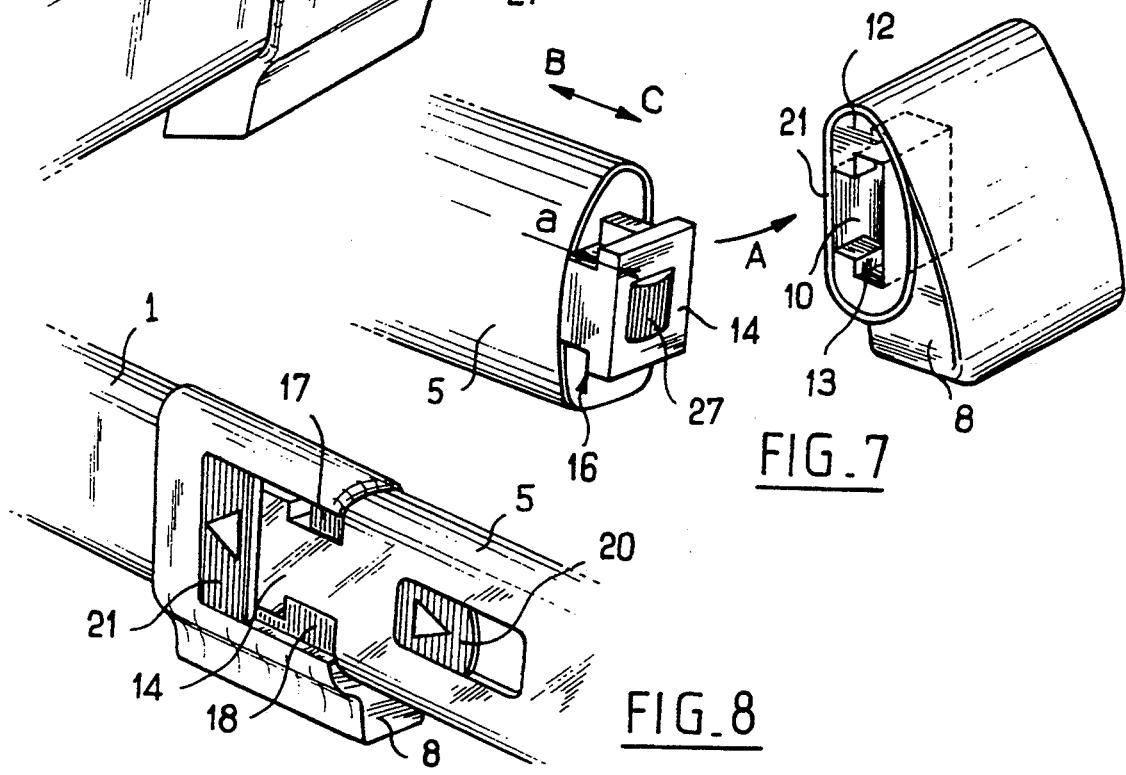
FIG. 7
FIG. 8

MOTOR VEHICLE ROOF-RACK

The present invention relates to a roof-rack for a motor vehicle.

BACKGROUND OF THE INVENTION

Some vehicles, in particular single-volume vehicles or an estate car or a station wagon type vehicles include longitudinal bars permanently disposed on top of the roof of the vehicle. They constitute lateral fixing means for a load placed on the roof if the roof is load-supporting.

Such bars also constitute a base for installing transverse bars intended for supporting a load when the roof is not load-supporting.

Such transverse bars are accessories that should be removed when no longer in use. They generate wind noise and they constitute a factor that increases wind resistance, and thus fuel consumption. If not absolutely essential, the removal of such transverse bars is at least advisable and constitutes a constraint on the user since a "home" must be found for the bars when they are not in use. In many cases this "home" is constituted by the luggage compartment of the vehicle, thereby conflicting with intelligent use of the luggage compartment.

One solution, known in particular from document DE-A-3 814 799 consists in providing housings in the longitudinal bars for the transverse bar elements. That solution is quite complex and above all it gives rise to a roof-rack that is heavy. In addition, in an option where the transverse bar elements are to be added, it requires the user to implement an assembly that is somewhat complicated and that uses a hinge.

SUMMARY OF THE INVENTION

The present invention proposes a solution providing easy storage for the transverse bars of a roof-rack based on a portion of each longitudinal bar becoming a transverse bar, on being displaced.

More precisely, the present invention provides a roof-rack device for a motor vehicle roof the device including at least two longitudinal elements each of which are couplable to the roof of the vehicle by two end legs. According to the invention, each longitudinal element includes at least one additional leg between the two end legs, subdividing each longitudinal element into at least two bars, at least one of which bars is movably connected to an end leg and the additional leg via a releasable link means enabling said movable bar to be installed either between the two end legs of the same longitudinal element, or between the two additional legs of two different longitudinal elements situated at the same longitudinal position along the roof of the vehicle.

In a variant embodiment, the roof-rack includes two additional legs defining a central bar in each longitudinal element of the rack plus two fixed end portions, the central bar being connected to the end portions in the same manner as the above moving bar.

In a first embodiment of the invention, the link means include corresponding engagement members provided at the ends of the bars and in the legs, and associated with locking members for locking the engagements achieved in both positions of each bar. In this embodiment, the bar is completely disconnected from the two end portions with which it forms a longitudinal bar, and then, by means of the link means, it is connected transversely to said legs to constitute a transverse bar.

In a second embodiment, the link means include at least one hinge between one end of the bar and one of the two legs about an axis substantially perpendicular to the roof of the vehicle, and engagement means carried by the other end of the bar and by the legs and suitable for cooperating with the bar in each of its positions. In which case, to switch from a roof-rack having two longitudinal bars to a roof-rack having two transverse bars, one of the ends of each of the moving bars is disconnected so as to be rotated through about 90° and it is connected to the leg of the other longitudinal bar from which the corresponding moving bar has previously been disconnected.

In order to make lengthwise adjustments possible and in order to take into account, in particular, different spacings that may exist between the two longitudinal elements on vehicle roofs, while manufacturing only one series of elements, the moving bar of each roofrack element is advantageously telescopic, and in particular it is telescopic between two positions that correspond respectively to its length when constituting a part of the longitudinal element of the roof-rack and its length when constituting a transverse bar.

In the hinged version of a roof-rack of the invention, the hinge axis is carried by one of the legs by means of a bearing having a certain amount of freedom, and in particular that is elastically deformable so as to make it possible when passing the bars from their longitudinal position to their transverse position for said bars to cross over by being moved out of a plane of rotation that would otherwise have been fixed if the hinge was rigidly secured in the corresponding end portion.

In order to ensure that the connections are safe in each of the two positions of each moving bar, the engagement means that provide said connections include a manually-actuated locking member that is normally maintained or urged into its locking position by a resilient return member.

In order to avoid noise due to vibration and in order take up to clearance, it may be advantageous to provide for the moving bar to be in two portions that slide longitudinally relative to each other and that have a resilient return member therebetween urging them towards a minimum length position that is slightly shorter than the length between the fixed portions of the releasable link means such that the bar establishes tension between said means. In particular, when the moving bar is hinged, its end carrying the hinge is in the form of a guide rod on which the main portion of said bar is slidably mounted, with the return member being coupled between them so as to minimize the length of the assembly formed by said rod and the main portion of the bar.

BRIEF DESCRIPTION OF THE DRAWINGS

Other characteristics and advantages of the invention appear from the following description which relates to each of the two embodiments mentioned above.

Reference is made to the accompanying drawings, in which:

FIGS. 3 and 4 are view identical to FIGS. 1 and 2 but in which one of the end portions of each of the longitudinal elements is reduced to a single leg;

FIG. 5 shows an embodiment of the engagement members carried by the fixed end portions of the roofrack of the invention;

FIG. 6 is an outside view of the link between an end portion of the roof-rack and a central portion for the purpose of making up a longitudinal element;

FIG. 7 shows the engagement and locking elements carried by one end of the moving central portion of the roof-rack of the invention ready for co-operating with the engagement elements of the fixed portions in the transverse bar position;

FIG. 8 is a view identical to FIG. 6 showing the link between the central portion and the fixed elements of the roof-rack for forming a longitudinal bar.

DESCRIPTION OF PREFERRED EMBODIMENTS

Figure 1:
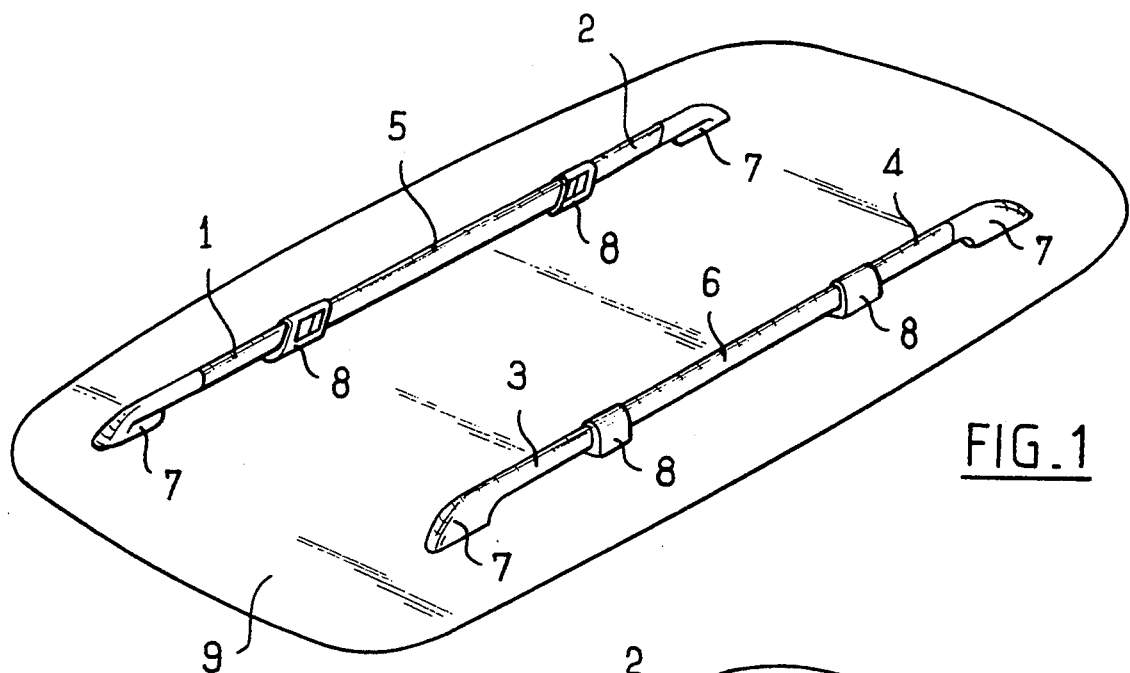
FIG. 1 is an overall view of a vehicle roof fitted with a roof-rack of the invention.
Figure 2:
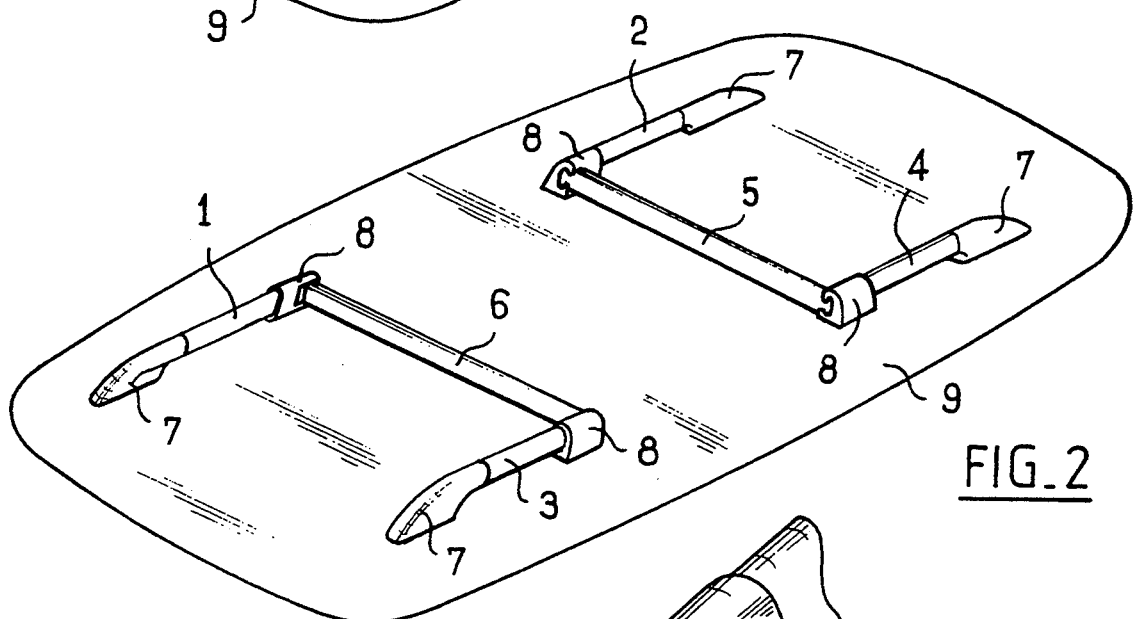
FIG. 2 is a similar view of the same roof-rack of the invention with bars disposed transversely.

A roof-rack of the invention as shown in FIGS. 1 and 2 the longitudinal element comprises four end portions of bars 1, 2, 3, and 4 that are fixed, and two central portions of bars 5 and 6 that are movable. Each fixed end portion of bars 1, 2, 3, and 4 includes a respective end leg 7 and a respective additional leg 8 coupling each longitudinal element to the roof 9 of a motor vehicle.

In FIG. 1, the bar 5 is disposed longitudinally between the end portions of bars 1 and 2, and the bar 6 is disposed in the same way but between the end portions of bars 3 and 4, thereby constituting two longitudinal roof bars.

In contrast, FIG. 2 shows the bar 5 placed between the end portions of bars 2 and 4 while the bar 6 is placed between the other two end portions of bars 1 and 3 so as to form two transverse bars. The means linking the bars 5 and 6 to the end portions of bars 1, 2, 3, and 4 in the two possible positions for each of the bars are situated substantially in the additional legs 8 so that the load is properly taken up by the roof of the vehicle. In the example shown in FIGS. 1 and 2, the bars 5 and 6 are of a length equal to the distance between the two longitudinal roof elements, but this condition is not essential to the invention since the bars 5 and 6 could be telescopic.

FIGS. 3 and 4 show one of the two end portions of the bars in each longitudinal element reduced to a small end leg 7. The bars 1 and 3 are then connectable and disconnectable between the legs 7 and additional legs 8. It should be observed that it would not be outside the ambit of the present invention if it were the portions of bars 2 and 4 that were movable as shown for the purpose of being placed transversely instead of the portions of bars 1 and 2.

One example of the link between the bars and the end portions, regardless of whether the central portions are disposed longitudinally or transversely, is to be seen in FIGS. 5 to 7.

In FIGS. 5 and 7 there can be seen a secondary or intermediate additional leg 8 (also see FIGS. 1–4) which includes a special end opening 10 (see FIG. 7) constituted by two orthogonal T-shaped openings, with the crossbar of the T being vertical and with the upright of the T being horizontal, and with one of the ends of the crossbar of the T being twice as thick as the other end thereof. Thus, the opening 10 (see FIG. 7) outlines the same opening section 13 (see FIG. 5) on two orthogonal faces 11 and 12 of the additional leg 8. This makes it possible to insert a link piece such as that referenced by 14 in FIG. 7 into the opening 10 perpendicularly either to the face 11 or to the face 12, which link piece 14 is secured to the end of a movable bar such as bar 5. The piece 14 has a general section in a plane parallel to the longitudinal direction of the bar 5 that is of substantially the same shape as the section of opening 13 outlined by the opening 10 in the faces 11 and 12 of the additional leg 8. The only difference lies in the fact that this section which is generally T-shaped is narrower in its top portion than the corresponding top portion 13a (see FIG. 5) that is to be received in the opening 10. In other words, the dimension a in FIG. 7 is about half the dimension b in FIG. 5.

The grooves 16 defined by the piece 14 beneath the flanges of the T-shape pass the projecting portions 17 and 18 (see FIG. 5) of the opening 10 when the piece 14 is inserted in said opening 10 perpendicularly to one or other of its faces 11 and 12, as shown by arrow A in FIG. 7. However, the portion 17 can be passed only if a locking element is removed from the groove, which element is retractable in the direction B shown in FIG. 7 against a return member (not shown) that urges it in direction C that is opposite to direction B, as also shown in FIG. 7. This locking member is moved by means of a manual pushbutton 20 (see FIGS. 6 and 8) that is accessible at the end of each of the bars 5 and 6, e.g. on the side thereof.

From FIG. 7, it will be understood that it is possible to insert the piece 14 into the opening 10 by moving it perpendicularly to the face 12 of the additional leg 8 providing the locking member is retracted in the direction B. Once the piece has been fully received in the opening 10, the locking member is released enabling it to be received behind the projecting portion 17 of the opening 10 and thus preventing the piece 14 from moving in the direction opposite to the direction referenced by A in FIG. 7. By inserting the piece 14 into the opening 10, a shutter 21 (see FIG. 8) is simultaneously urged back against a resilient member (not shown) into a position where it closes the open mouth of the opening 10 in the face 11 of the additional leg 8.

Once all of the ends of the bars 5 and 6 have been received in a manner shown in FIG. 7 in the corresponding openings 10 in the additional legs 8 and have been locked into place, a roof-rack of the invention is made up that has two transverse bars as shown in FIG. 2. To return the bars 5 and 6 into alignment respectively with the end portions of bars 1 and 2 and 3 and 4, the procedure is as shown in FIG. 8, i.e. the piece 14 at each end of each of the bars 5 and 6 is inserted into the opening 10 in the corresponding leg perpendicularly to the outside face 11 of the opening. To do this, the shutter 21 is pushed back to disengage the mouth 13 of the opening 10 in the face 11 and after retracting the locking member to pass the projecting portion 17. When the piece 14 is received in the opening 10, the shutter 21 can return to its closed position as shown in FIG. 6, thereby masking the connection.

Figure 9:
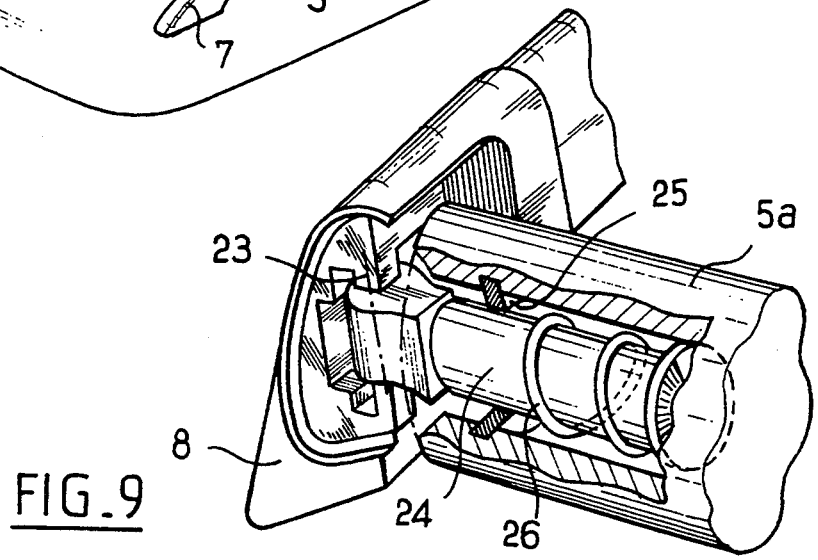
FIG. 9 is a view of a hinged link between the moving central portion and one of the fixed elements of the roof-rack.

In a variant embodiment of the invention, the bars 5 and 6 may each be hinged at one end to one of the fixed portions of bars 1 and 2 for the bar 5 or 3 and 4 for the bar 6. One example of such a hinge is shown in FIG. 9, e.g. between the bar 5 and the bar 2. The bar 2 carries a hinge pin 23 in a housing that is covered by a shutter of the same kind as the shutter 21 in the preceding figures, the hinge pin 23 points substantially towards the roof of the vehicle and carries a rod 24 on which the main portion 5a of the roof-rack bar 5 is slidably mounted. An annular abutment 25 secured to a element forms an abutment surface for a spring 26 which also bears against an end shoulder of the rod 24. The spring 26 thus tends to shorten the total length of the bar 5 as constituted by the portion 5a and the rod 24. Naturally, the bar 6 may be hinged in the same manner to the fixed portion 3.

To enable the bars 5 and 6 to be rotated simultaneously, provision is made for the hinge 23 to have a certain amount of freedom relative to its general direction perpendicular to the roof 9 of the vehicle, thus enabling the bars 5 and 6 to be lifted slightly so that their free ends can be crossed over. The means implemented for obtaining this function may be obtained by choosing a suitably resilient material to form either the hinge itself between the rod 24 and the hinge pin 23, or else for forming the support between the hinge pin 23 and the inside of the additional leg 8.

The other ends of the bars 5 and 6 have respective pieces 14 as described above that co-operate with respective openings 10 formed in the corresponding additional legs 8 that do not have hinge axes.

To engage piece 14 in an opening 10 as carried either by the additional leg 8 transversely adjacent to the leg 8 having the hinge 23, or else by the additional leg 8 that is longitudinally adjacent to said additional leg 8, provision is made for pulling slightly on the portion 5a of the bars 5 and 6 since their length at rest is slightly shorter than the distance between the additional legs 8. This makes it possible to place the moving bars 5 and 6 under tension between the fixed bars 1, 2, 3, and 4, with said tension serving to take up slack and thus avoiding any danger of noise due to vehicle vibration.

This adjustable length or telescopic disposition of the bars 5 and 6 of the roof-rack of the invention may be repeated along such elements in order to obtain greater amplitude in the amount of length variation available in each bar.

Finally, as a secondary point, it may be Observed that a resilient catch 27 is provided at the longitudinal end of each piece 14 for co-operating with a recess 28 formed in the inside wall of each piece-receiving opening 10. The catch provides a small amount of additional safety, being capable of holding the elements in engagement in the event of the locking member not operating, and it also serves to mark the proper position of a portion relative to a leg.

We claim:

1. A roof-rack device for a motor vehicle roof comprising at least two longitudinal elements couplable to the roof of the vehicle and each longitudinal element having two end legs and at least one additional leg between the two end legs, subdividing each longitudinal element into at least two bars, a releasable link means movably connecting at least one of said bars of each longitudinal element to a said end leg and to an additional leg such that at least one of said bars is a movable bar and the movable bar is positionable between the two end legs of the same longitudinal element, or between two additional legs or two end legs of two different longitudinal elements situated at the same longitudinal position along the roof of the vehicle.

2. A device according to claim 1, wherein each longitudinal element includes two additional legs which define a central bar and two fixed end portions of the longitudinal element, the central bar being connected to the fixed end portions via said releasable link means that are connectable and disconnectable such that the central bar is connectable between the two fixed end portions and between the two fixed end portions of two different longitudinal elements situated at the same longitudinal position along the roof of the vehicle.

3. A device according to claim 1, wherein the link means include engagement members provided at ends of the bars and in the additional legs, and associated with a locking member for locking the engagements achieved in both positions of each bar.

4. A device according to claim 1, wherein the link means include at least one hinge between an end of the movable bar and one of the additional legs about an axis substantially perpendicular to the roof of the vehicle, and engagement means carried by the another end of the bar and by the additional legs and suitable for co-operating with the bar in each of its positions.

5. A device according to claim 4, wherein the hinge has an axis with an amount of freedom by means of an elastically deformable bearing.

6. A device according to claim 4, wherein the end of the bar carrying the hinge is in the form of a guide rod having a main portion slidably mounted on the guide rod, a return member being coupled between the guide rod and the main portion for minimizing the length of an assembly of the guide rod and said main portion.

7. A device according to claim 1, wherein the bar is telescopic.

8. A device according to claim 1, wherein the link means includes a manually-actuated locking member that is normally in a locking position.

* * * * *